United States Patent [19]

Ponce De Leon, III

[11] Patent Number: 5,915,789
[45] Date of Patent: Jun. 29, 1999

[54] FLEXIBLE AND ADJUSTABLE HARNESS

[76] Inventor: Francisco Ponce De Leon, III, 2160 Dorado Dr., Rancho Palos Verdes, Calif. 90275

[21] Appl. No.: 09/069,061

[22] Filed: Apr. 28, 1998

[51] Int. Cl.[6] .................... A62B 35/00; B60R 21/00
[52] U.S. Cl. .................... 297/484; 297/485; 297/465; 297/486; 297/254; 297/255; 297/DIG. 6
[58] Field of Search .................... 297/484, 465, 297/485, 486, 228.1, 228.12, 228.13, 254, 255, 219.1, 230.1, DIG. 6

[56] References Cited

U.S. PATENT DOCUMENTS

| | | | |
|---|---|---|---|
| 1,048,033 | 12/1912 | Brown | 297/484 X |
| 2,428,088 | 9/1947 | McEachern | 297/254 |
| 2,451,007 | 10/1948 | White | 297/485 |
| 2,627,903 | 2/1953 | Stevenson | 297/254 |
| 2,637,372 | 5/1953 | Angelo | 297/254 |
| 2,649,236 | 8/1953 | Vaccari et al. | 297/485 |
| 2,852,066 | 9/1958 | Hawkins | 297/255 X |
| 3,099,486 | 7/1963 | Scott | 297/484 X |
| 3,125,375 | 3/1964 | Bird et al. | 297/465 |
| 3,127,215 | 3/1964 | Hubbard | 297/255 X |
| 3,136,311 | 6/1964 | Lewis | 297/DIG. 6 X |
| 3,136,581 | 6/1964 | Caballero | 297/484 X |
| 3,385,633 | 5/1968 | Aizley | 297/484 X |
| 3,495,849 | 2/1970 | Cetrone | 297/485 |
| 3,499,681 | 3/1970 | Benitez, Jr. et al. | 297/484 |
| 3,536,357 | 10/1970 | Murcott | 297/485 |
| 3,713,692 | 1/1973 | McCracken et al. | 297/485 X |
| 3,992,040 | 11/1976 | Gannac | 297/484 X |
| 4,050,737 | 9/1977 | Jordan | 297/465 |
| 4,093,307 | 6/1978 | McLennan | 297/485 |
| 4,188,065 | 2/1980 | Meeker | 297/485 |
| 4,235,474 | 11/1980 | Rosenberg | 297/285 X |
| 4,592,592 | 6/1986 | Peek | 297/484 X |
| 4,639,946 | 2/1987 | Koenig | 297/465 |
| 4,702,523 | 10/1987 | Schroder et al. | 297/485 |
| 4,834,460 | 5/1989 | Herwig | 297/485 |
| 4,848,793 | 7/1989 | Huspen et al. | 297/465 X |
| 4,871,210 | 10/1989 | Alexander et al. | 297/485 |
| 4,876,755 | 10/1989 | Parrish | 297/230.1 X |
| 4,898,185 | 2/1990 | Fuller | 297/485 X |
| 4,979,779 | 12/1990 | Williams | 297/484 X |
| 4,981,307 | 1/1991 | Walsh | 297/465 X |
| 5,031,960 | 7/1991 | Day | 297/465 X |
| 5,056,869 | 10/1991 | Morrison | 297/484 X |
| 5,148,563 | 9/1992 | Klearman | 297/485 X |
| 5,154,487 | 10/1992 | Warburton | 297/465 |
| 5,267,352 | 12/1993 | Rodarmel | 297/465 X |
| 5,310,245 | 5/1994 | Lyszczasz | 297/DIG. 6 X |
| 5,354,121 | 10/1994 | Allum | 297/485 |
| 5,456,519 | 10/1995 | Davis | 297/DIG. 6 X |
| 5,499,860 | 3/1996 | Smith et al. | 297/255 |
| 5,564,788 | 10/1996 | Warhaftig | 297/486 X |
| 5,649,744 | 7/1997 | Apodaca | 297/484 |

FOREIGN PATENT DOCUMENTS

| | | | |
|---|---|---|---|
| 2856366 | 2/1980 | Germany | 297/DIG. 6 |
| 166141 | 7/1987 | Japan | 297/465 |
| 1185153 | 3/1970 | United Kingdom | 297/465 |

*Primary Examiner*—Jose V. Chen
*Assistant Examiner*—Rodney B. White
*Attorney, Agent, or Firm*—Michael Farjami, Esq.

[57] ABSTRACT

A flexible and adjustable harness used by drivers of cranes and earth moving equipment is disclosed. In its preferred embodiment, the flexible and adjustable harness is used when it is necessary for a driver of a crane or an earth moving equipment to lean over to view objects such as loads and obstacles directly below his or her seat. The flexible and adjustable harness includes a flexible slip-on portion that easily slips onto the driver seat. The harness also includes a flexible right wrap and a flexible left wrap which enclose the driver's abdominal and chest areas and bear the weight of the driver when he or she leans over to view loads or obstacles under his or her seat. The flexible and adjustable harness also comprises left and right wrap elastic safety bands that add to the protection and safety provided by the left and right wraps. The flexible and adjustable harness further includes back side left and right safety bands to safely secure the harness' slip-on portion to the driver seat. Two optional shoulder straps may be used for added protection and safety of the driver. Also optional lumbar and structural support pillows may be utilized for added safety and comfort of the driver.

27 Claims, 7 Drawing Sheets

FIG. 5A
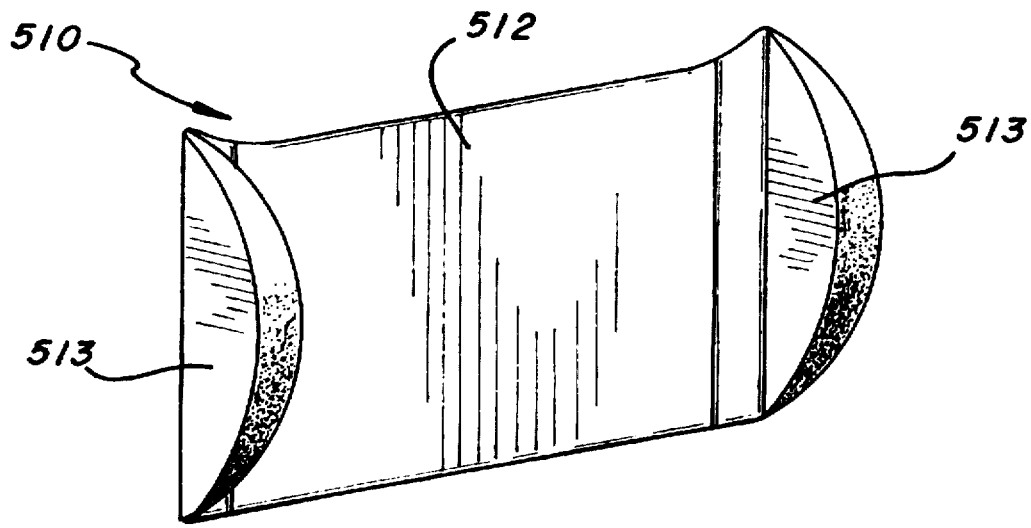
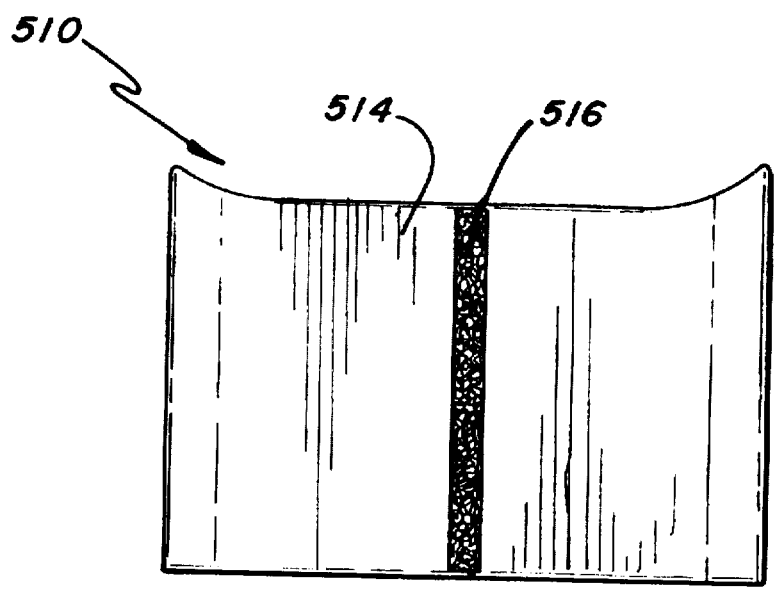
FIG. 5B

FLEXIBLE AND ADJUSTABLE HARNESS

BACKGROUND OF THE INVENTION

1. Field of the Invention

The present invention relates generally to the field of restraints and harnesses. More specifically, the invention relates to the field of harnesses used in cranes and earth moving equipment.

2. Background Art

Harnesses are commonly worn by various individuals since they (i.e. harnesses) are required for safety and/or comfort of the individual wearing them. Moreover, some harnesses are worn since they are required for performance of certain jobs or certain tasks. Some harnesses are worn for safety of others in addition to the person wearing the harness. Virtually every vehicle requires an individual operating the vehicle or an individual seated in the vehicle to wear a harness of some type. Examples of such vehicles are vehicles used for work, recreation, or general transportation.

Since a given job or task can be very different from other jobs or tasks, a harness used for each job or task should, in theory, be different from harnesses used for other jobs or tasks. Similarly, since a particular vehicle can be used for a purpose very different from the purpose for using other vehicles, harnesses used with different vehicles should be very different from one another. Thus, the specifics of each task and/or the purpose for using a vehicle should be fundamental factors in determining the type of harness that an individual should wear. To be sure, a variety of harnesses exist in the prior art that are used for different purposes. The patents and the sales brochure discussed below are directed to these different types of harnesses.

U.S. Pat. No. 5,649,744 to Apodaca ("Apodaca") discloses a seat harness. Apodaca discloses a harness for use by crane operators. The harness includes a pair of torso straps which are secured to the back of the operator's seat. A pair of shoulder straps are also secured to the back of the operator's seat. Apodaca requires the operator's seat to be modified by the addition of four anchor portions. Apodaca also requires use of threaded anchor fasteners to fasten the anchors to the operator's seat.

U.S. Pat. No. 5,215,354 to Grene ("Grene") discloses a vehicle safety restraint for pregnant women. Grene teaches a safety restraint consisting of an upper torso strap and two short shoulder straps supporting the upper torso strap. Grene also discloses two thigh straps. Grene is directed to preventing the abdominal areas of a pregnant woman from contact with a restraint. In this manner, the pregnant woman is protected in case of sudden stops of a vehicle or an accident.

U.S. Pat. No. 4,927,211 to Bolcerek ("Bolcerek") discloses a child safety harness. The Bolcerek harness includes a chest pad, a back pad, shoulder pads, and a chest strap which can be connected between the chest pad and the back pad. Bolcerek also discloses a crotch strap which can be connected between the chest pad and the back pad. Bolcerek further discloses a loop through which a car seat belt is secured.

U.S. Pat. No. 4,709,966 to Parkinson et al ("Parkinson") discloses a child restraint device. The device consists of two shoulder straps. The shoulder straps are secured to the seat of a vehicle with the help of another strap and a buckle. The device also includes a coupling ring between the shoulder straps.

U.S. Pat. No. 5,301,371 to Chao ("Chao") discloses a safety vest. Chao specifically discloses a vest that covers the entire body of a child to avoid accidental strangling of the child due to a tightened belt or strap. Moreover, Chao's vest is secured to a car's seat via the car's seat belt.

U.S. Pat. No. 5,226,698 to Harrison ("Harrison") discloses a harness for securing a child in a conventional chair. The Harrison's harness consists of one longitudinal strap, two parallel straps, and one elastic loop. The elastic loop is used to secure the harness to a chair.

U.S. Pat. No. 5,435,272 to Epstein ("Epstein") discloses a support harness for a child. Epstein's support harness consists of two loops to hold a toddler between the legs and a strap attached to the top of the loops for carrying the child. Parents of the child would guide the child to walk by controlling the harness by means of two handles.

U.S. Pat. No. 4,226,474 to Rupert et al ("Rupert") discloses a safety harness consisting of a pair of shoulder straps connected to a pair of torso straps and a number or releasable fastening devices that get locked into fasteners attached to a vehicle seat. The safety harness includes a zipper in the back of the harness.

U.S. Pat. No. 4,205,670 to Owens discloses a safety harness for children for use on school buses. Owens' harness includes a torso strap and a chest strap. Owens harness must be permanently attached to the bus seat.

U.S. Pat. No. 4,488,691 to Lorch ("Lorch") discloses a harness system for restraining the torso of a crewman in an aircraft. U.S. Pat. No. 5,378,046 to Gordy et al ("Gordy") discloses a portable seat belt for restraining a child in a shopping cart. U.S. Pat. No. 4,632,425 to Barratt ("Barratt") discloses a passenger restraint system and U.S. Pat. No. 5,499,860 to Smith et al ("Smith") discloses a collapsible child seat.

U.S. Pat. No. 3,428,029 to Klickstein et al ("Klickstein"), U.S. Pat. No. 3,385,633 to Aizley ("Aizley"), U.S. Pat. No. 3,321,247 to Dillender ("Dillender"), U.S. Pat. No. 1,898,090 to Lethern ("Lethern"), U.S. Pat. No. 1,316,163 to Kennedy ("Kennedy"), and U.S. Pat. No. 1,298,615 to Wilkinson ("Wilkinson") all disclose various safety harnesses.

In addition to the above patents, a sales brochure dated 1997 and published by Kwic Products of Anaheim, Calif. discloses a product called Top Dog Back-Pro for use by drivers of cranes. The Top Dog Back-Pro product discloses two shoulder straps, a chin strap, and two torso straps. The shoulder straps, chin strap, and torso straps are all connected to each other and must be held together as a unit.

Unfortunately, there are no efficient and useful specialized harnesses designed for drivers of cranes and/or earth moving equipment. Up to now there is no known specialized harness that can be easily, efficiently, and practicably used by drivers of cranes and/or earth moving equipment that satisfies the particular needs of such drivers.

Some of the prior art harnesses that are currently used by some drivers of cranes and earth moving equipment require modifying the driver's seat with anchors in order to secure the harness to the seat. This requirement for modification creates the necessity of additional labor and parts to manufacture the driver's seat when the crane and/or earth moving equipment is being built. Moreover, drivers who have already purchased their crane or earth moving equipment have to spend their own time and also incur very large expenses for parts and labor to modify their seats to incorporate the required anchors. Further, some drivers who have already purchased their crane or earth moving equipment will find that the anchors have to be placed at particular seat locations where the seat has no strong surface to support such anchors. For those drivers, the seat is simply not modifiable to include the required anchors and as such the harness cannot be utilized at all.

Accordingly, there is serious need in the art for harnesses that meet the needs of drivers of crane and earth moving equipment. Such vehicles (i.e. cranes and earth moving equipment) require the driver to lean over to view a load or obstacle directly below his or her seat. Moreover, harnesses used in cranes and earth moving equipment must be worn with ease and must not require a person other than the driver to aid the driver in wearing the harness. Further, harnesses used in cranes and earth moving equipment must permit the driver to have great flexibility to operate the cranes or earth moving equipment with great control, especially when emergency situations require quick reactions by the driver. Thus, although some harness used for cranes and heavy equipment do not require a modification to the driver's seat, those harnesses require a person other than the driver to assist the driver to wear the harness; and, moreover, they (i.e. the harnesses) greatly reduce the mobility and flexibility of the driver in operating the crane or the earth moving equipment.

Thus, there is serious need in the art for a harness for use in cranes and earth moving equipment that solve the shortcomings of the prior art and meet the specific needs of drivers of cranes and earth moving equipment stated above. In addition to the shortcomings of the prior art harnesses in lacking flexibility, mobility, and ease of use required by drivers wearing harnesses for use in cranes and earth moving equipment, the prior art harnesses have other shortcomings.

For example, many of the prior art harnesses that are used in cranes and earth moving equipment do not act as a strong "fall arrest" device to prevent the driver from falling from his seat when the driver leans over to view loads or obstacles below his crane or earth moving equipment. Moreover, many of the prior art harnesses do not help in reducing an otherwise persistent pressure off of the driver's lower back, upper back, and neck muscles. With many of the prior art's harnesses, the driver of a crane or earth moving equipment has to keep his back and neck in an angled and leaning position for very long periods of time, for example for hours at a time. This results in driver fatigue and increases risk of fall due to fatigue and also increases risk of injury to the driver's back and neck muscles due to fatigue, and other medical problems associated with persistent pressure on a single group of muscles.

Another disadvantage of the prior art harnesses that are used with cranes and earth moving vehicles is that such harnesses have a large number of straps and other required components. This results in additional costs for labor and material and renders the prior art harnesses too expensive.

SUMMARY OF THE INVENTION

The invention is a flexible and adjustable harness used by drivers of cranes and earth moving equipment. In its preferred embodiment, the invention's harness is used when it is necessary for a driver of a crane or an earth moving equipment to lean over to view objects such as loads and obstacles directly below his or her seat. The invention's harness ensures that the driver does not fall from his or her seat when the driver leans over, i.e. the harness acts as a "fall arrest" device. Moreover, the invention's harness takes an otherwise persistent pressure off of the driver's lower back, upper back, and neck muscles when the driver is required to keep his or her back and neck in an angled and leaning position for very long periods of time.

The invention's harness thus prevents fatigue, risk of fall due to fatigue, and injury to the driver's back and neck muscles due to fatigue. Moreover, the invention provides for safe operation of cranes and earth moving equipment by keeping the driver less tired and more alert. The invention also permits the driver to easily wear the harness without spending too much time. Also, the driver can wear the invention's harness by himself and without help of another. The invention further permits the driver to easily disengage himself from the harness and manipulate the controls in the cab of a crane or other earth moving equipment. Moreover, the invention permits the driver to move around with a certain degree of freedom especially when the invention's optional shoulder straps are not used.

The invention's harness includes a flexible slip-on portion that easily slips onto the driver seat. The harness also includes a flexible right wrap and a flexible left wrap which enclose the driver's abdominal and chest areas and bear the weight of the driver when he or she leans over to view loads or obstacles under his or her seat. The invention's harness also comprises left and right wrap elastic safety bands that add to the protection and safety provided by the left and right wraps.

The invention further includes back side left and right safety bands to safely secure the harness' slip-on portion to the driver seat. Two optional shoulder straps may be used for added protection and safety of the driver. Also optional lumbar and structural support pillows may be utilized for added safety and comfort of the driver.

BRIEF DESCRIPTION OF THE DRAWINGS

FIG. 5A is a front view of a structural support pillow for use with the invention's flexible and adjustable harness.

FIG. 5B is a rear view of a structural support pillow for use with the invention's flexible and adjustable harness.

DETAILED DESCRIPTION OF THE INVENTION

The present invention is a flexible and adjustable harness. Although the invention is described with respect to certain specific embodiments, the principles of the invention, as defined by the claims appended herein, can obviously be applied beyond the specifically described embodiments. Moreover, in the description of the present invention, certain details have been left out in order to not obscure the inventive aspects of the invention. The details left out are within the knowledge of a person of ordinary skill in the art and can be filled in by such a person.

The invention is a flexible and adjustable harness which has a wide variety of applications particularly in cranes and earth moving equipment. In its preferred embodiment, the invention is utilized as a harness for drivers of cranes for loading containers onto ships.

Figure 1:
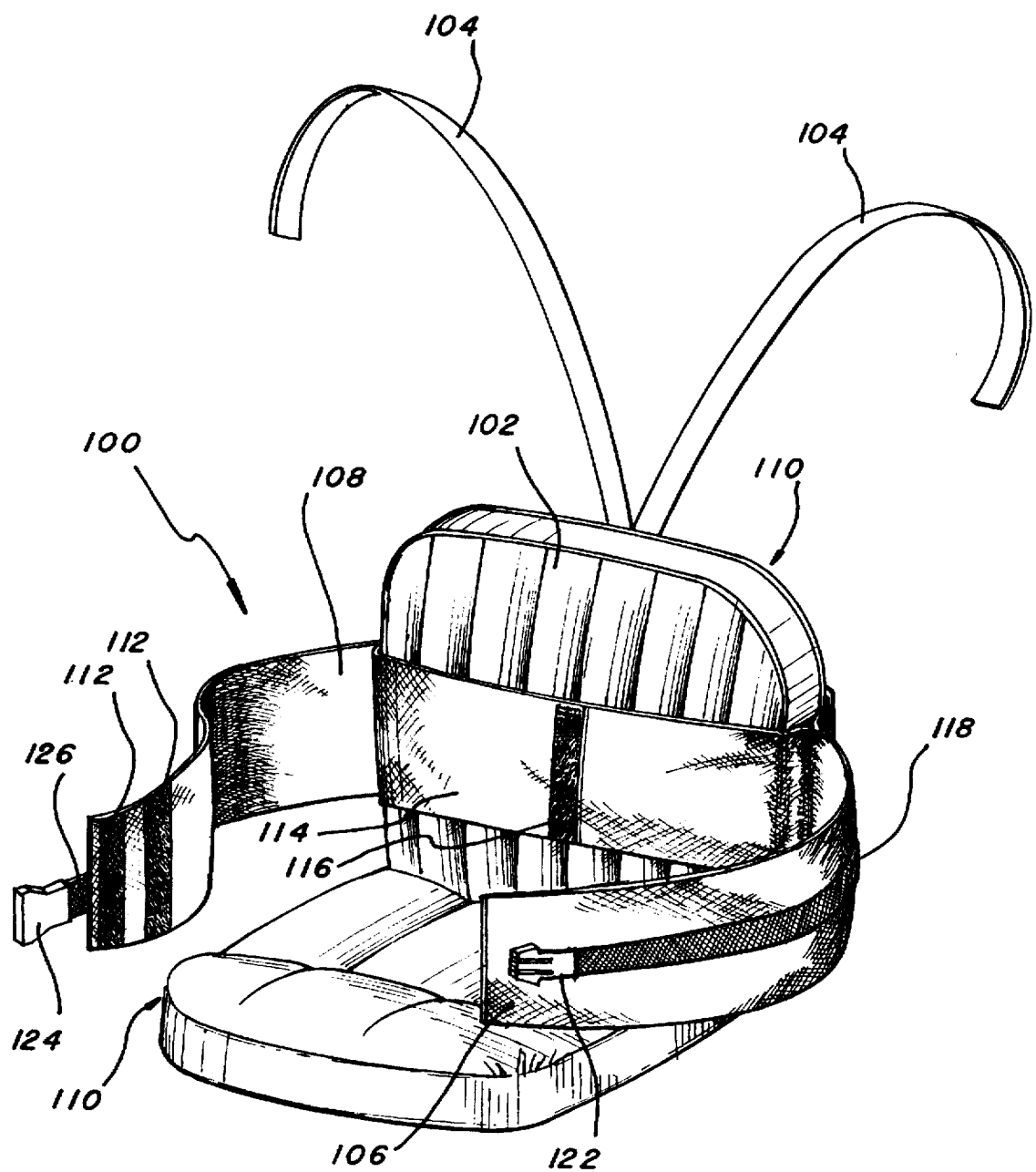
FIG. 1 illustrates a perspective view of the invention's flexible and adjustable harness.

FIG. 1 illustrates a perspective view of flexible harness 100 of the present invention. The invention's harness 100 is slipped over back support 102 of a typical driver seat 110. Harness 100 includes left wrap 106, right wrap 108, wrap Velcro strips 112, front side 114 of the flexible slip-on portion (the rear side of flexible slip-on portion is not shown in FIG. 1), slip-on portion Velcro strip 116, left wrap elastic safety band 118, male safety clip 122, female safety clip 124, and right wrap elastic safety band 126. Harness 100 may also include two optional shoulder straps 104.

Figure 2:
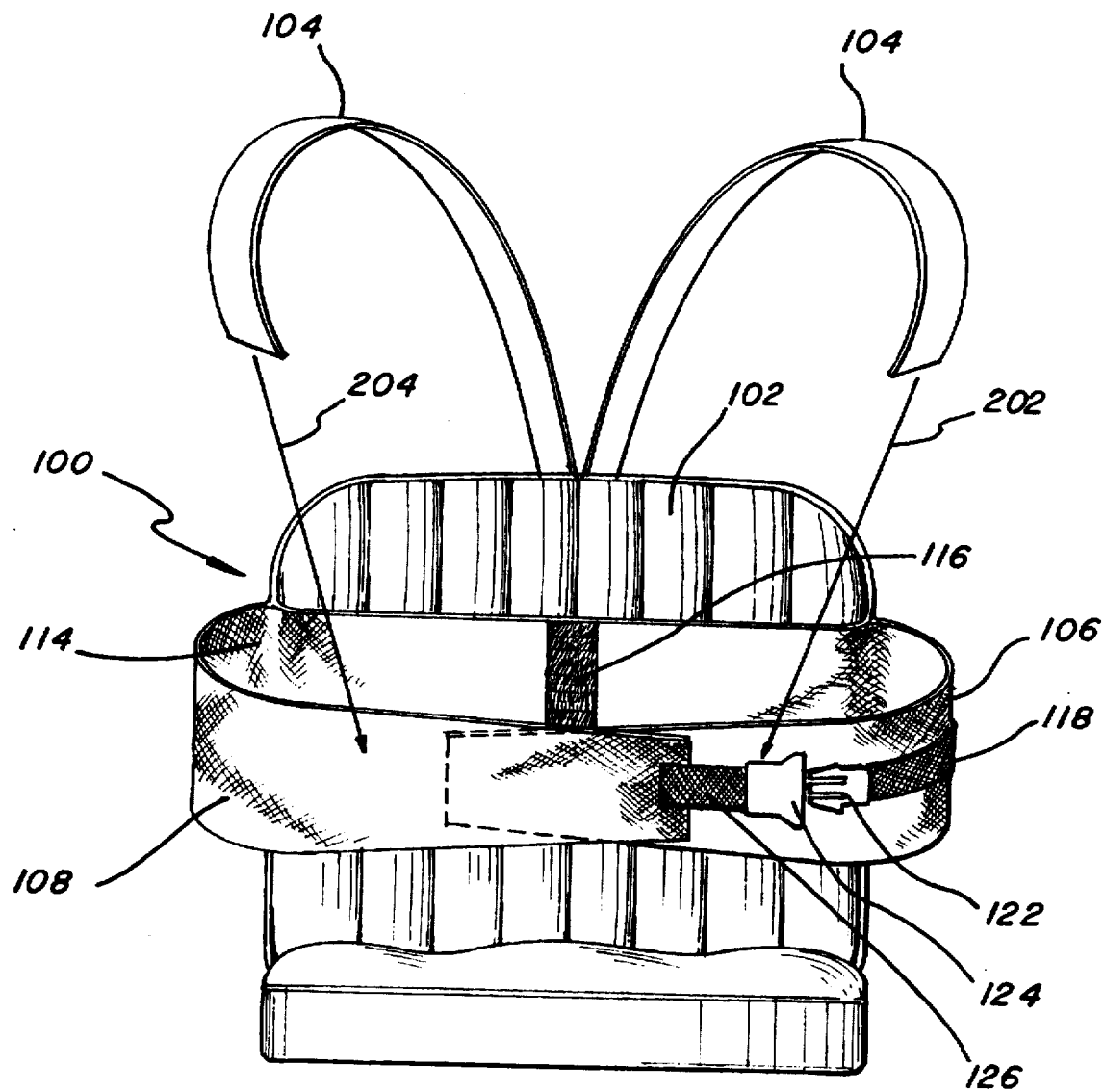
FIG. 2 is a front view of the invention's flexible and adjustable harness.

FIG. 2 illustrates a front view of flexible harness 100 while showing only back support 102 of the driver seat (other parts of the driver seat are not shown in FIG. 2). As in FIG. 1, the driver seat back support is indicated by numeral 102. FIG. 2 also shows left wrap 106, right wrap 108, front side 114 of the flexible slip-on portion, slip-on portion Velcro strip 116, left wrap elastic safety band 118, male safety clip 122, female safety clip 124, and right wrap elastic safety band 126. FIG. 2 further shows optional shoulder straps 104. Arrows 202 and 204 will be discussed later in the present application.

Figure 3:
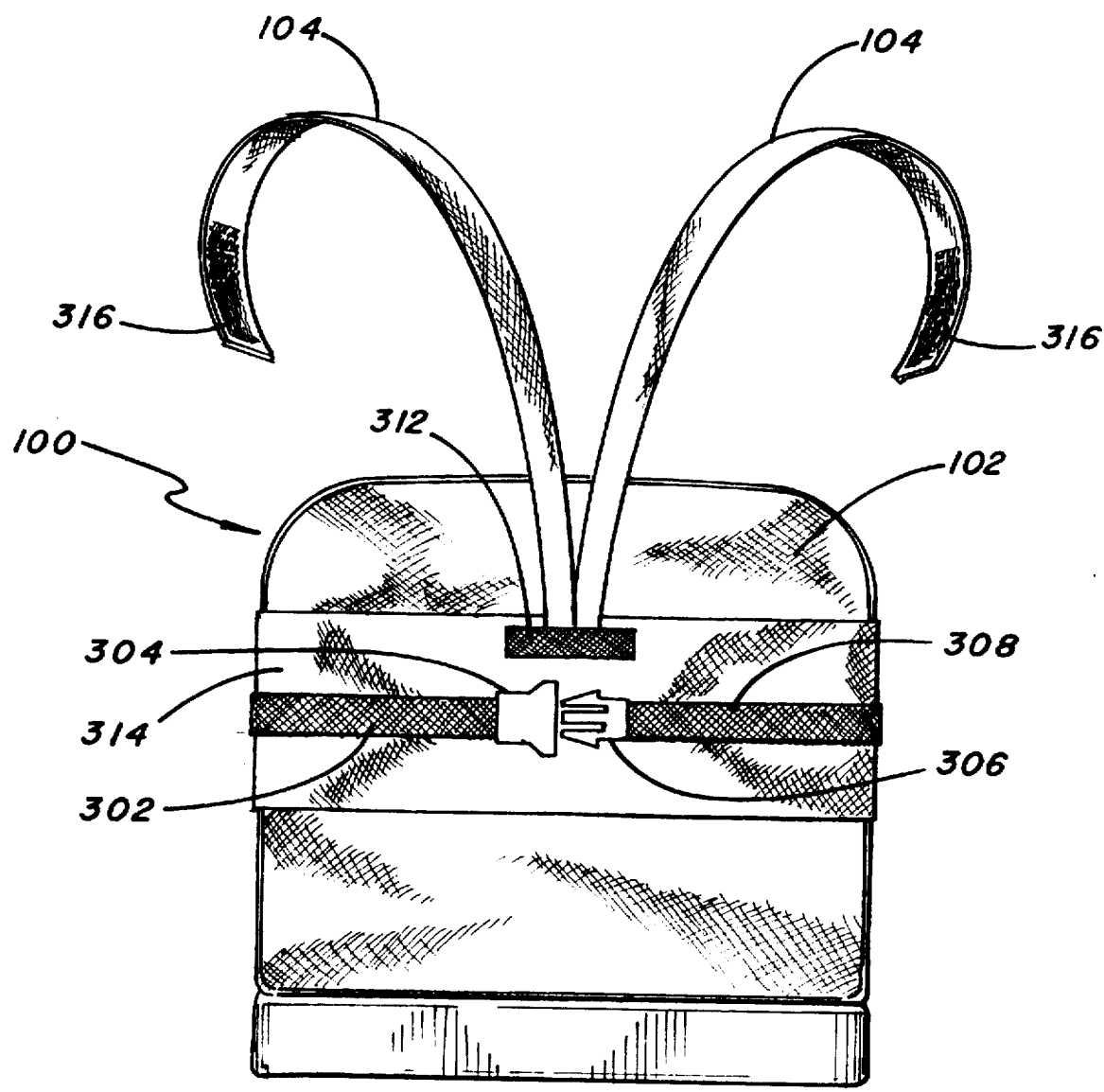
FIG. 3 is a rear view of the invention's flexible and adjustable harness.

FIG. 3 illustrates a rear view of the invention's flexible harness 100. As in FIGS. 1 and 2, the driver seat back support is indicated by numeral 102 (the remainder of the driver seat is not shown in FIG. 3). FIG. 3 also shows back side 314 of the flexible slip-on portion, back side right safety band 308, male safety clip 306, female safety clip 304, and back side left safety band 302. FIG. 3 further shows joining strip 312 and a rear view of optional shoulder straps 104 including inside velcro segments 316 of the shoulder straps (inside Velcro segments 316 were blocked from view in FIGS. 1 and 2).

Figure 4A:
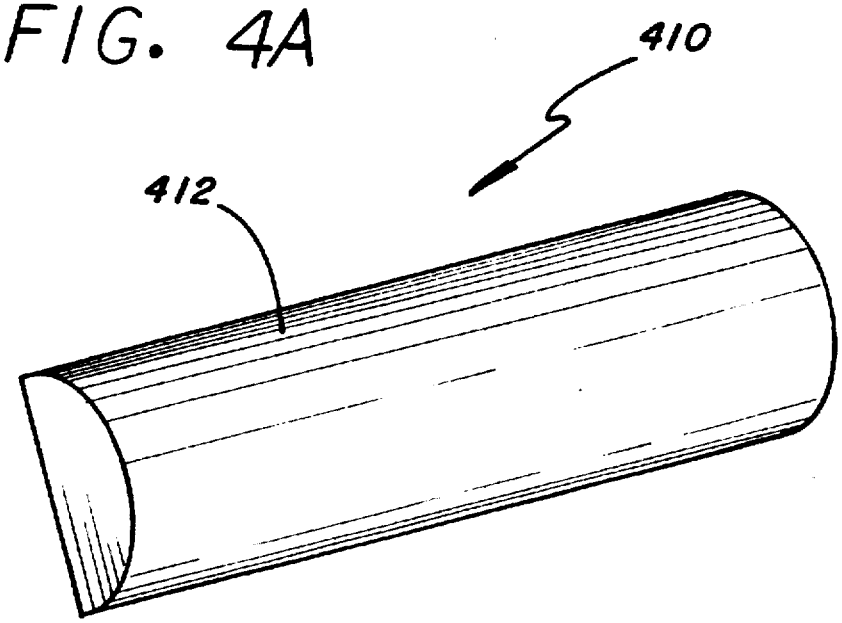
FIG. 4A is a front view of a lumbar support pillow for use with the invention's flexible and adjustable harness.
Figure 4B:
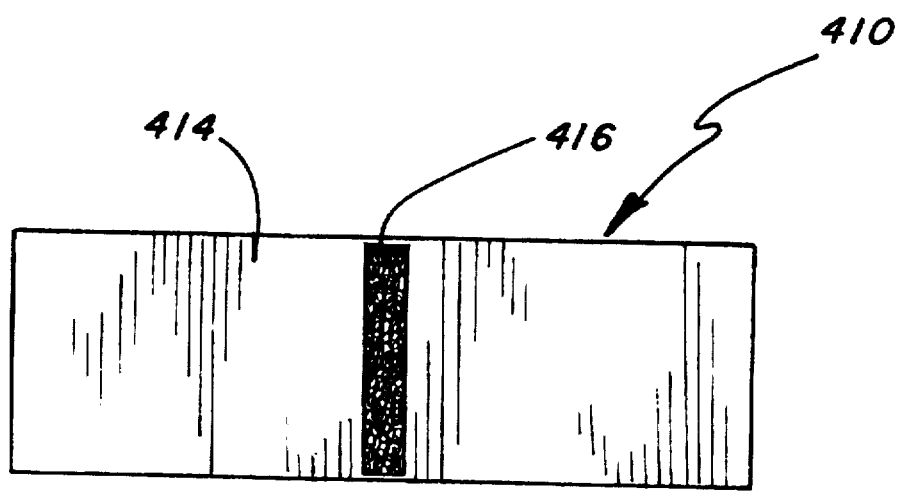
FIG. 4B is a rear view of a lumbar support pillow for use with the invention's flexible and adjustable harness.

FIG. 4A shows a front view of optional lumbar support pillow 410 that may be used in the present invention in a manner described later in this application. FIG. 4B shows a rear view of optional lumbar support pillow 410. As shown in FIG. 4A, optional lumbar support pillow 410 has a convex outer surface 412. As shown in FIG. 4B, rear surface 414 of optional lumbar support pillow 410 is flat and has a Velcro strip 416 for use in a manner discussed later in this application.

FIG. 5A shows another type of optional support pillow, i.e. optional structural support pillow 510, that may be used with the present invention's harness in a manner explained later in the present application. FIG. 5B shows a rear view of the optional lumbar support pillow 510. As shown in FIG. 5A, optional lumbar support pillow 510 has a central flat surface 512 that is flanked by two side supports 513. The two side supports 513 are identical. Each side support 513 is thicker in its center and tapers in thickness as it nears the corner points of central flat surface 512. As shown in FIG. 5B, rear surface 514 of optional structural support pillow 510 is flat and has a Velcro strip 516 for use in a manner discussed later in this application.

Referring to FIGS. 1, 2, and 3, in the preferred embodiment of the invention, front side 114 and back side 314 of the flexible slip-on portion of the invention's harness are made of flexible and elastic material such as neoprene so as to form a continuous neoprene slip. The continuous neoprene slip is sized such that it has to be extended a bit in order to slip onto back support 102 of driver seat 110. Thus, the neoprene slip (comprising front side 114 and back side 314) results in a tight and secure fit of harness 100 over back support 102.

Slip-on portion Velcro strip 116 is comprised of numerous minute "loops" that engage with the "hooks" portion of the Velcro strip of an optional support pillow used in the present invention. In other words, when optional lumbar support pillow 410 is used, the "hooks" portion of Velcro strip 416 of lumbar support pillow 410 engage with the "loops" portion of slip-on portion Velcro strip 116. This secures optional lumbar support pillow 410 to the invention's harness 100 and provides support, safety and comfort for the driver's lumbar area. Similarly, when optional structural support pillow 510 is used, the "hooks" portion of Velcro strip 516 of structural support pillow 510 engage with the "loops" portion of slip-on portion Velcro strip 116. This secures optional structural support pillow 510 to the invention's harness 100 and provides support, safety and comfort for the driver's lower back and upper back areas.

Left wrap 106 and right wrap 108 are also made of flexible neoprene material and are joined to front side 114 and back side 314 of the flexible slip-on portion by stitching, sewing, knitting, stapling, gluing or other known methods. Both left wrap 106 and right wrap 108 have outer surfaces that include a large area of Velcro material. The Velcro material on left wrap 106 would engage right wrap Velcro strips 112 and inside Velcro segments 316 of optional shoulder straps 104. The Velcro material on right wrap 108 would engage inside Velcro segments 316 of optional shoulder straps 104.

A driver seated in seat 110 would enwrap himself with left wrap 106 and would pull right wrap 108 over left wrap 106. The outer surface of left wrap 106 is comprised of Velcro material. Right wrap velcro strips 112 thus engage the Velcro material of the outer surface of left wrap 106 and tightly secure the driver to harness 100 and to seat 110. In the preferred embodiment of the present invention, left wrap elastic safety band 118 and right wrap elastic safety band 126 are made of flexible rubber material. For added safety, male safety clip 122 is locked into female safety clip 124, thus causing left wrap elastic safety band 118 to be locked into right wrap elastic safety band 126 to further secure the enclosure made by left wrap 106 and right wrap 108. FIG. 2 shows how left wrap 106, right wrap 108, and elastic bands 118 and 126 would enclose the abdominal and lower chest areas of a driver and secure him or her tightly to driver seat 110.

FIGS. 1, 2, and 3 also show optional shoulder straps 104, and FIG. 3 shows inside Velcro segments 316 of optional shoulder straps 104. Optional shoulder straps 104 are not necessary to the present invention and are not used in some embodiments of the invention. In a preferred embodiment, optional shoulder straps 104 are made of flexible neoprene material. However, in another embodiment of the invention, optional shoulder straps 104 are made of inelastic nylon material. After a driver is seated in driver seat 110 and after the driver wears harness 100 by securing himself or herself with left wrap 106, right wrap 108, elastic safety bands 118, 126, and safety clips 122 and 124, the driver has the option of pulling optional shoulder straps 104 (if the optional shoulder straps are in fact included in the particular embodiment used by the driver) over his or her shoulders and securing optional shoulder straps 104 to the left and right wraps by means of engagement of inside Velcro segments 316 with the outer Velcro surfaces of the left and right wraps. Referring to FIG. 2, arrows 202 and 204 indicate how optional shoulder straps 104 are pulled down towards the left and right wraps and how they may be engaged with the Velcro area of the outer surfaces of the left and right wraps.

Referring to FIG. 3, joining strip 312 ensures that optional shoulder straps 104 are safely and securely attached to back side 314 of the flexible slip-on portion of the invention's harness. Back side left safety band 302 and back side right safety band 308 are typically made of inelastic nylon material. Safety bands 302 and 308 are stitched to back side 314 of the flexible slip-on portion so that when male safety clip 306 locks into female safety clip 304, the neoprene slip of the invention's harness is further tightly secured, thus giving the driver added protection.

Figure 6:
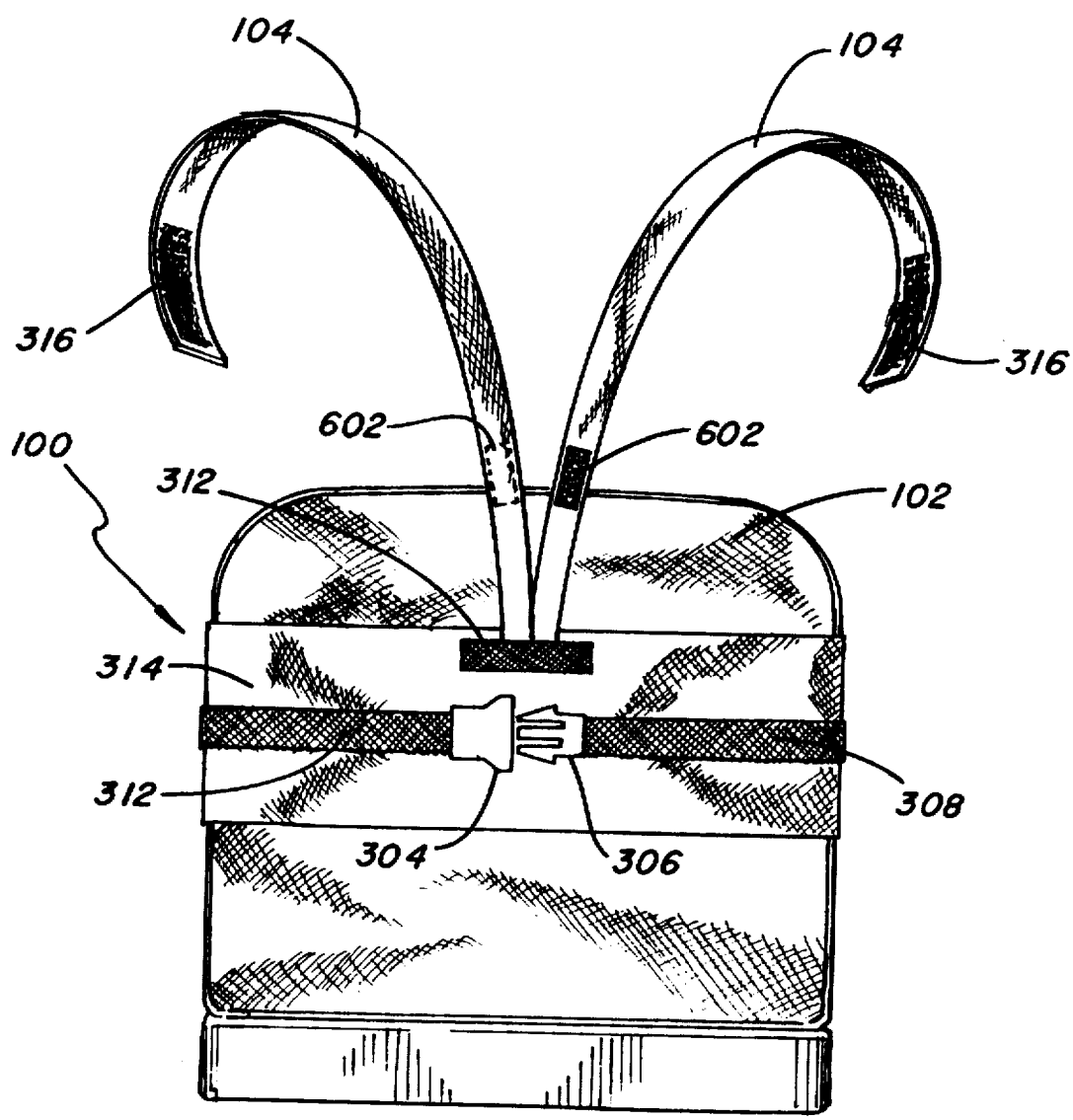
FIG. 6 is a rear view of one embodiment of the invention's optional shoulder straps.
Figure 7:
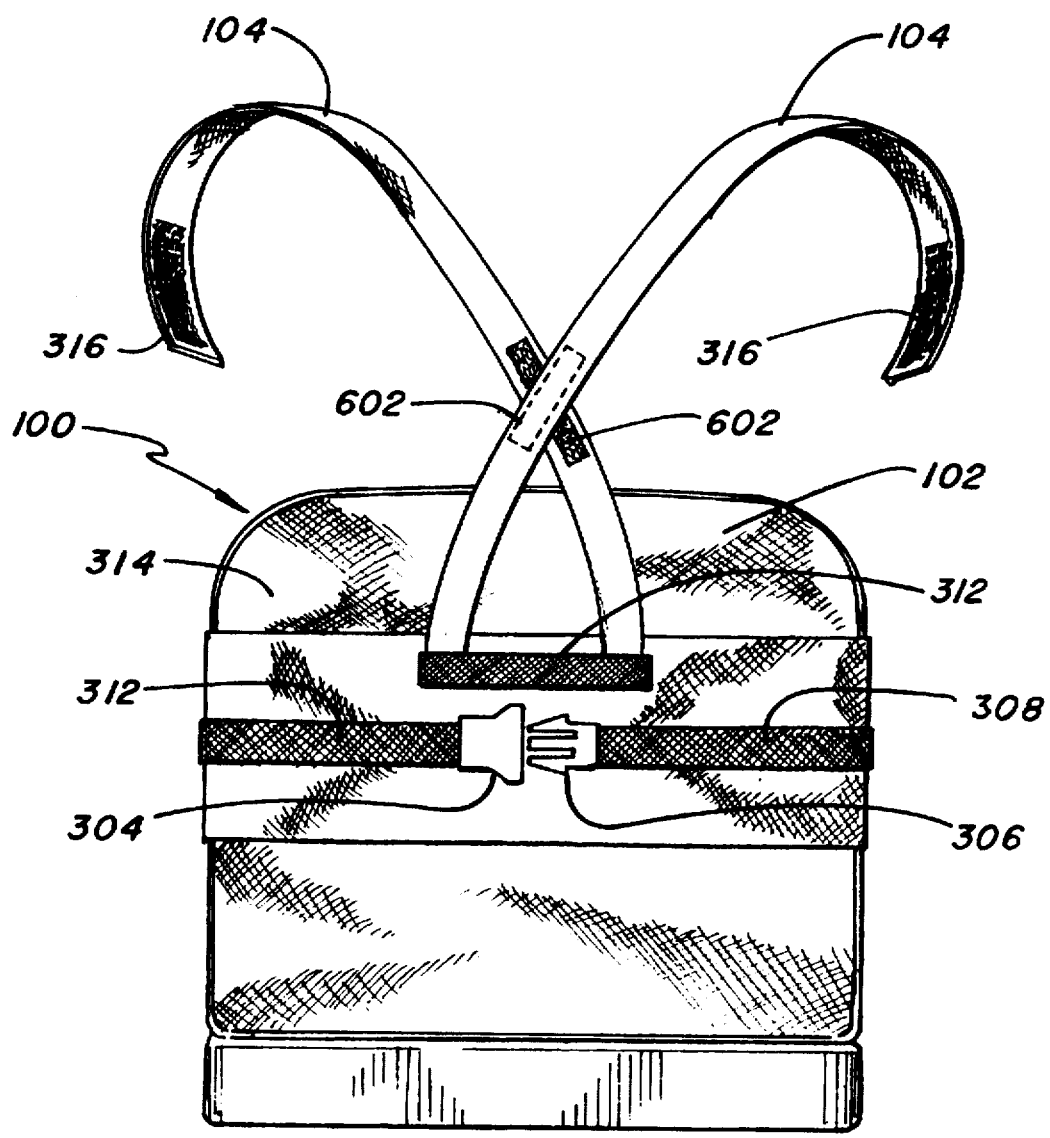
FIG. 7 is another rear view of the embodiment of the invention's optional shoulder straps shown in FIG. 6.

FIGS. 6 and 7 illustrate a preferred embodiment of optional shoulder straps 104 of the present invention. FIG. 6 shows back side 314 of the flexible slip-on portion, back side right safety band 308, male safety clip 306, female safety clip 304, and back side left safety band 302. FIG. 3 further shows joining strip 312 and a rear view of optional shoulder straps 104 including inside Velcro segments 316 of the shoulder straps. FIG. 6 further shows two velcro strips 602, each being located on a respective optional shoulder strap 104. Each Velcro strip 602 is located approximately half way between joining strip 312 and the mid-point of its respective optional shoulder strap 104.

The "hooks" and "loops" portions of Velcro strips 602 of each of optional shoulder strap 104 engage each other in a manner shown in FIG. 7. As seen in FIG. 7, strips 602 cause optional shoulder straps 104 to maintain a crossed configuration. The crossed configuration of optional shoulder straps 104 helps in better securing a driver to the invention's flexible and adjustable harness 100.

In its preferred application, the invention's flexible and adjustable harness is used when it is necessary for a driver of a crane or an earth moving equipment to lean over to view objects such as loads and obstacles directly below his or her seat. The invention's harness is thus needed for several reasons. Among other reasons, the invention's harness is needed to ensure that the driver does not fall from his or her seat, i.e. the harness acts as a "fall arrest" device. Moreover, the invention's harness is needed to take an otherwise persistent pressure off of the driver's lower back, upper back, and neck muscles. In the absence of the invention's harness, the driver has to keep his or her back and neck in an angled and leaning position for very long periods of time, for example for hours at a time. The invention's harness thus prevents fatigue, risk of fall due to fatigue, injury to the driver's back and neck muscles due to fatigue, and other medical problems associated with persistent pressure on a single group of muscles. Moreover, the invention provides for safe operation of cranes and earth moving equipment by keeping the driver less tired and more alert.

The invention also permits the driver to easily wear the harness without spending too much time. The ability of the driver to easily wrap himself or herself in the harness encourages the drivers to use the harness at all times. Also, the driver can wear the invention's harness by himself and without help of another. The invention further permits the driver to easily disengage himself from the harness and manipulate the controls in the cab of a crane or other earth moving equipment. The fact that the invention permits for easy disengagement is critical in emergency situations when the driver has to react to his or her environment. For example, if the driver suddenly notices the need to change the setting of a control in the cab of the crane, the driver can simply unwrap the harness, change the setting and then wrap himself back in again.

Moreover, the invention permits the driver to move around with a certain degree of freedom especially when the optional shoulder straps are not used. Some of the prior art harnesses restrict the mobility of the driver since they require that the shoulder straps be used. The prior art shoulder straps restrict the freedom of the upper back portion and the chest portion of the driver. Due to this loss of freedom, many drivers have chosen not to use harnesses at all. In the present invention, even when a driver decides to use the optional shoulder straps his or her freedom is still largely maintained. The reason is that the present invention is designed such that the optional shoulder straps, if used, bear only a small percentage of the weight of the driver. Indeed, the invention can be fully utilized without the use of the optional shoulder straps. In other words, the invention's harness, unlike the prior art harnesses, is fully complete and fully functional without the existence or use of the shoulder straps.

Finally, since the invention's harness is fully functional without optional shoulder straps 104, the invention's harness does not have a large number of components and straps. Accordingly, the cost of labor and material for production of the invention's harness is lower than the cost of labor and material for prior art harnesses designed for use with cranes and earth moving equipment.

Thus, a flexible and adjustable harness has been described.

I claim:

1. An adjustable and flexible harness comprising:

a flexible one-piece continuous tubular slip-on portion for flexibly securing said harness to a driver seat;

said flexible slip-on portion having an open bottom end and an open top end, said open bottom end and said open top end permitting said slip-on portion to slip over a back support of said driver seat so that said open top end is placed lower than a top of said back support of said driver seat;

said flexible slip-on portion being removable from said back support of said driver seat;

a left wrap and a right wrap extending from opposite outer sides of said slip-on portion for restraining a driver to said driver seat, said left wrap and right wrap being engaged and disengaged at a front side of said driver, wherein said left and right wraps bear a weight of an upper body of said driver when said driver leans forward to view an object below said driver seat.

2. The adjustable and flexible harness of claim 1 further comprising an adjustable shoulder strap for restraining said driver to said driver seat; said adjustable shoulder strap being capable of engaging an outer surface of said right and left wraps at a plurality of locations.

3. The adjustable and flexible harness of claim 2 where said adjustable shoulder strap comprises neoprene material.

4. The adjustable and flexible harness of claim 2 wherein said adjustable shoulder strap engages an outer surface of said right wrap.

5. The adjustable and flexible harness of claim 4 wherein said outer surface of said right wrap and said adjustable shoulder strap comprise hook and loop fastener material.

6. The adjustable and flexible harness of claim 2 wherein said adjustable shoulder strap engages an outer surface of said left wrap.

7. The adjustable and flexible harness of claim 6 wherein said outer surface of said left wrap and said adjustable shoulder strap comprise hook and loop fastener material.

8. The adjustable and flexible harness of claim 2 wherein said adjustable shoulder strap bears said weight of said upper body of said driver when said driver leans forward to view said object below said driver seat.

9. The adjustable and flexible harness of claim 1 wherein said flexible slip-on portion comprises neoprene material.

9

10. The adjustable and flexible harness of claim 1 wherein said left and right wraps comprise neoprene material.

11. The adjustable and flexible harness of claim 1 wherein said right wrap includes a right wrap strip for engaging an outer surface of said left wrap so as to restrain said driver to said driver seat.

12. The adjustable and flexible harness of claim 11 wherein said right wrap strip and said outer surface of said left wrap comprise hook and loop fastener material.

13. The adjustable and flexible harness of claim 1 further comprising a left wrap elastic safety band.

14. The adjustable and flexible harness of claim 13 further comprising a right wrap elastic safety band.

15. The adjustable and flexible harness of claim 14 wherein said left wrap elastic safety band comprises a first safety clip and wherein said right wrap elastic safety band comprises a second safety clip and wherein said first and second safety clips engage so as to restrain said driver to said driver seat.

16. The adjustable and flexible harness of claim 1 further comprising a back side left safety band and a back side right safety band.

17. The adjustable and flexible harness of claim 16 wherein said back side left safety band comprises a first safety clip and wherein said back side right safety band comprises a second safety clip and wherein said first and second safety clips engage so as to restrain said driver to said driver seat.

18. The adjustable and flexible harness of claim 1 wherein said flexible slip-on portion further includes a first strip for engaging with a pillow.

19. The adjustable and flexible harness of claim 18 wherein said pillow can be a lumbar support pillow comprising a second strip for engaging with said first strip, and wherein said first and second strips comprise hook and loop fastener material.

20. The adjustable and flexible harness of claim 18 wherein said pillow can be a structural support pillow comprising a second strip for engaging with said first strip, and wherein said first and second strips comprise hook and loop fastener material.

21. An adjustable and flexible harness comprising:

a flexible one-piece continuous tubular slip-on portion for flexibly securing said harness to a driver seat;

said flexible slip-on portion having an open bottom end and an open top end, said open bottom end and said open top end permitting said slip-on portion to slip over a back support of said driver seat so that said open top end is placed lower than a top of said back support of said driver seat;

said flexible slip-on portion being removable from said back support of said driver seat;

a left wrap and a right wrap for restraining a driver to said driver seat, said left wrap and right wrap being engaged and disengaged at a front side of said driver, wherein said left and right wraps bear a weight of an upper body of said driver when said driver leans forward to view an object below said driver seat;

said harness further comprising an adjustable shoulder strap for restraining said driver to said driver seat; said adjustable shoulder strap including a fastening means for engaging an outer surface of said right and left wraps at a plurality of locations.

22. The adjustable and flexible harness of claim 21 wherein said flexible slip-on portion further includes a first strip for engaging with a pillow.

23. The adjustable and flexible harness of claim 22 wherein said pillow can be a lumbar support pillow comprising a second strip for engaging with said first strip, and wherein said first and second strips comprise hook and loop fastener material.

24. The adjustable and flexible harness of claim 22 wherein said pillow can be a structural support pillow comprising a second strip for engaging with said first strip, and wherein said first and second strips comprise hook and loop fastener material.

25. An adjustable and flexible harness comprising:

a flexible one-piece continuous tubular slip-on portion for flexibly securing said harness to a driver seat;

said flexible slip-on portion having an open bottom end and an open top end, said open bottom end and said open top end permitting said slip-on portion to slip over a back support of said driver seat so that said open top end is placed lower than a top of said back support of said driver seat;

said flexible slip-on portion being removable from said back support of said driver seat;

a left wrap and a right wrap for restraining a driver to said driver seat, said left wrap and right wrap being engaged and disengaged at a front side of said driver, wherein said left and right wraps bear a weight of an upper body of said driver when said driver leans forward to view an object below said driver seat;

said harness further comprising an adjustable shoulder strap for restraining said driver to said driver seat; said adjustable shoulder strap including a fastening means for engaging an outer surface of said right and left wraps at a plurality of locations;

said flexible slip-on portion further includes a first strip for engaging with a pillow.

26. The adjustable and flexible harness of claim 25 wherein said pillow can be a lumbar support pillow comprising a second strip for engaging with said first strip, and wherein said first and second strips comprise hook and loop fastener material.

27. The adjustable and flexible harness of claim 25 wherein said pillow can be a structural support pillow comprising a second strip for engaging with said first strip, and wherein said first and second strips comprise hook and loop fastener material.

* * * * *